United States Patent
Hardy et al.

[19]

[11] Patent Number: 6,108,404
[45] Date of Patent: Aug. 22, 2000

[54] METHOD AND SYSTEM FOR TESTING A CONNECTION IN A TELEPHONE NETWORK USING INTERACTIVE TELEPHONE RESPONSE MODULE

[75] Inventors: William C. Hardy, Dallas, Tex.; Earl L. Mannas, Germantown, Md.

[73] Assignee: MCI Communications Corporation, Washington, D.C.

[21] Appl. No.: 09/019,323

[22] Filed: Feb. 5, 1998

[51] Int. Cl.[7] .............................. H04M 1/24; H04M 3/08; H04M 3/22

[52] U.S. Cl. ..................... 379/21; 379/27; 379/21; 379/30; 379/32

[58] Field of Search .................. 379/21, 27, 30, 379/32, 1, 5, 6, 441, 442

[56] References Cited

U.S. PATENT DOCUMENTS

| | | | |
|---|---|---|---|
| 4,126,771 | 11/1978 | Proctor et al. | 232/175.3 R |
| 4,214,132 | 7/1980 | Kelso | 179/175 |
| 4,415,779 | 11/1983 | Bowman | 179/175.3 |
| 4,536,703 | 8/1985 | Jablway et al. | 324/52 |
| 4,550,223 | 10/1985 | Poitevin | 179/175.3 |
| 4,679,224 | 7/1987 | Lynch et al. | 379/26 |
| 4,748,651 | 5/1988 | Collins et al. | 379/22 |
| 4,827,498 | 5/1989 | Ross | 379/27 |
| 4,852,145 | 7/1989 | Bevers et al. | 379/27 |
| 4,937,464 | 6/1990 | Nanba et al. | 307/112 |
| 5,218,616 | 6/1993 | Stephens | 379/27 |
| 5,357,556 | 10/1994 | Dresser | 379/27 |
| 5,392,327 | 2/1995 | Galpin | 379/2 |
| 5,440,609 | 8/1995 | Curtis | 379/21 |
| 5,455,859 | 10/1995 | Gutzmer | 379/442 |
| 5,661,776 | 8/1997 | Charland | 379/2 |
| 5,687,213 | 11/1997 | Larkin | 379/21 |
| 5,896,451 | 4/1999 | Deas | 379/387 |
| 5,937,031 | 8/1999 | Stelman | 379/1 |
| 5,937,033 | 8/1999 | Bellows | 379/27 |
| 5,956,386 | 9/1999 | Miller | 379/27 |

*Primary Examiner*—Curtis A. Kuntz
*Assistant Examiner*—Quoc Tran

[57] ABSTRACT

A system and method for testing a telephone connection using an interactive telephone response module (ITRM). In one embodiment, the ITRM is connected between the handset and station set of a telephone terminating one end of the connection to be tested. In another embodiment, the ITRM is connected between the telephone connection and the station set of a telephone terminating one end of the connection to be tested. By operating switches on the ITRM, a user can impose predetermined conditions on the connection. A test coordinator located at a test point or other termination in the telephone network then tests the connection under the predetermined conditions.

14 Claims, 9 Drawing Sheets

METHOD AND SYSTEM FOR TESTING A CONNECTION IN A TELEPHONE NETWORK USING INTERACTIVE TELEPHONE RESPONSE MODULE

BACKGROUND OF THE INVENTION

1. Field of the Invention

The present invention relates generally to telephony, and more particularly to testing a connection in a telephone network.

2. Related Art

In a modem telephone network, the need often arises to evaluate the condition of the network. Typically, this evaluation takes place one connection at a time. Two endpoints are selected, thereby defining the connection. Test equipment is then deployed to one of the endpoints. In order to properly evaluate the connection, however, it is necessary to control the conditions imposed on the connection by the other endpoint.

In a conventional telephone network test method, a network switch is selected as one endpoint of the connection to be tested, and a particular telephone is selected as the other end of the connection. The selected switch is typically located in a central office of the network provider. In order to test the connection between a particular telephone and the selected switch, a technician with test equipment is dispatched to the location of the telephone. The technician connects the test equipment to the telephone and dials the selected switch to establish the connection to be tested.

In order to control the conditions imposed upon the connection by the switch end of the connection, a device known as a test responder is connected to the selected switch. In order to impose a particular condition on the connection to support a particular test, the technician may, for example, dial a particular number that causes the test responder to impose the particular condition on the connection.

A primary disadvantage of this approach is that a connection cannot be tested end-to-end, that is, between one termination and another. At most, a connection can be tested between one termination and a test point within the telephone network, such as a switch.

Another disadvantage of this approach is that connections to particular telephones can only be tested by sending a technician to the location of the telephone. This arrangement imposes significant costs on the network provider, and inconveniences the user of the telephone, who must rearrange his schedule to accommodate the technician.

SUMMARY OF THE INVENTION

The present invention is a system and method for testing a connection in a telephone network using an interactive telephone response module (ITRM). The ITRM enables a user to impose selected conditions on a telephone line. In another embodiment, the ITRM is connected between the handset and station set of a telephone terminating one end of the connection to be tested. In another embodiment, the ITRM is connected between the telephone network and the station set of a telephone terminating one end of the connection to be tested.

In one embodiment, the ITRM includes three switches, each for imposing a different condition on the telephone line, also referred to herein as a "connection." A "silence" switch disconnects the telephone handset or station set from the connection and can terminate the connection to a "silence circuit." This operation eliminates ambient noise produced by the telephone handset. This condition can be used to facilitate the measurement of line noise, also known as "quiet channel noise" and to test for and measure echo characteristics.

A "loopback" switch is used to echo signals received over the connection being tested. The condition imposed upon the connection by this operation can be used to facilitate the measurement of the round-trip delay of a signal transmitted to the ITRM.

A "tone" switch is used to transmit a signal with known characteristics over the connection. In a preferred embodiment the known signal is a sinusoidal signal of predetermined amplitude and frequency. The condition imposed upon the connection by this operation can be used to facilitate the measurement of line loss.

In a preferred embodiment, the ITRM is used as part of an interactive telephone test system to test the connection between a telephone and a test point or other termination. An end-to-end connection test can be performed by choosing a connection termination as the test point. A test coordinator connected to the test point establishes a connection to the telephone. When the telephone user answers, a voice prompter in the test coordinator instructs the user to operate the ITRM to produce a desired condition on the connection. The telephone user operates the ITRM as instructed to produce the desired condition on the connection. The test module then measures characteristics of the connection under the desired condition. When the measurement is complete, the test coordinator ends the connection to the telephone.

One advantage of the present invention is that a connection can be tested end-to-end, that is, from one termination of the connection to another.

Another advantage of the present invention is that a telephone connection can be tested under predetermined conditions without sending a trained technician to the location of the telephone, or installing complex equipment at the location of the telephone. The ITRM can be provided to a telephone user with simple instructions for connecting the ITRM to the telephone. The connection can then be tested automatically with little skill or effort required of the telephone user.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Introduction

The present invention is a system and method for testing a telephone connection using an interactive telephone response module (ITRM). In one embodiment, the ITRM is connected between the handset and station set of a telephone terminating one end of the connection to be tested. In another embodiment, the ITRM is connected between the telephone network and the station set of a telephone terminating one end of the connection to be tested. In either embodiment, a user can impose predetermined conditions on the connection by operating switches on the ITRM.

In a preferred embodiment, the ITRM is used as part of an interactive telephone test system. The network provider deploys a test coordinator at a test point or other termination in the telephone network. The test coordinator then establishes a connection between the test point and a telephone that is connected to an ITRM.

The test coordinator includes a voice prompter and a test module. The voice prompter instructs the telephone user in the operation of the ITRM. For example, the voice prompter instructs the telephone user to operate a particular switch on the ITRM, thereby imposing a desired condition upon the connection. The test coordinator then executes measurements on the connection under the desired condition.

The present invention is described in terms of the above example. This is for convenience only and is not intended to limit the application of the present invention. In fact, after reading the following description, it will be apparent to one skilled in the relevant art how to implement the present invention in alternative embodiments.

Interactive Telephone Response Module (ITRM)

Figure 1:
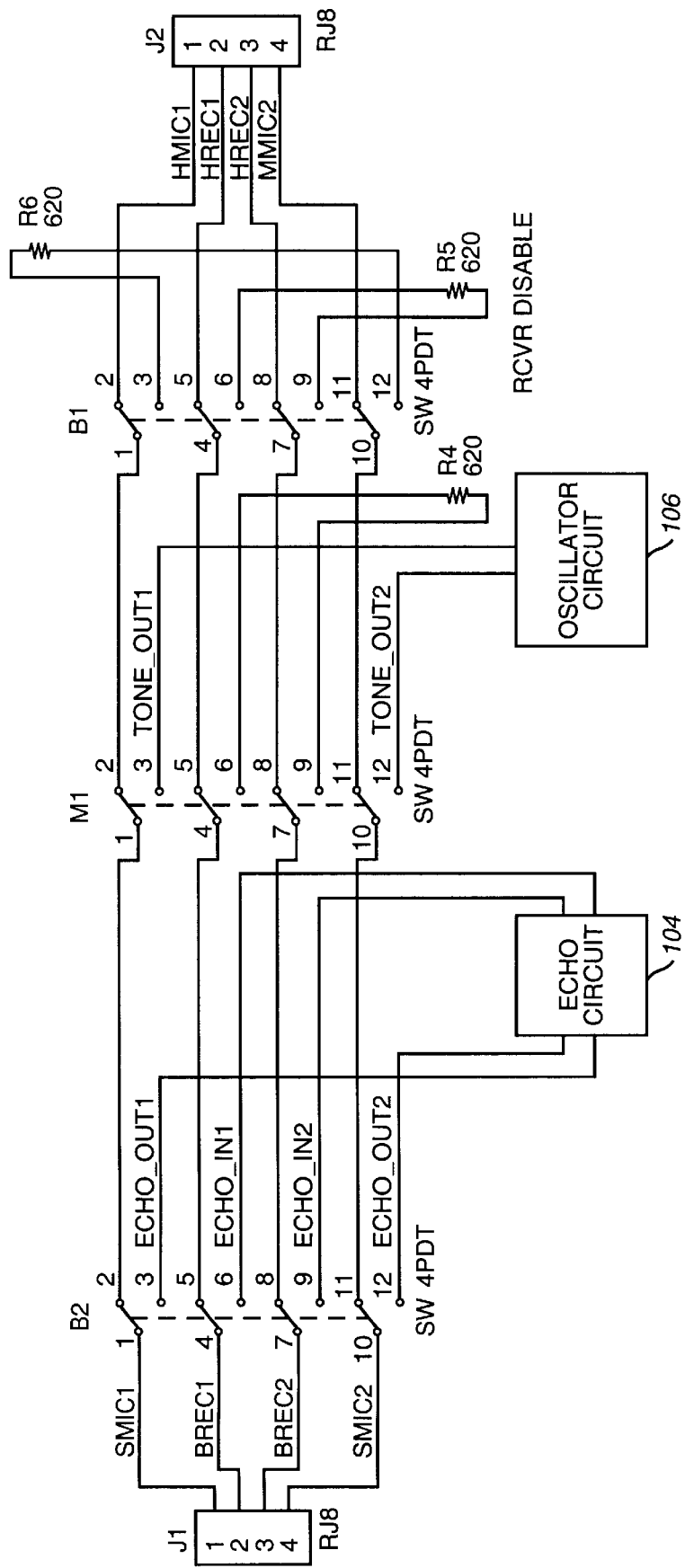
FIGS. 1 and 6 are circuit diagrams depicting two implementations of the interactive telephone response module (ITRM) according to a preferred embodiment of the present invention.
Figure 5:
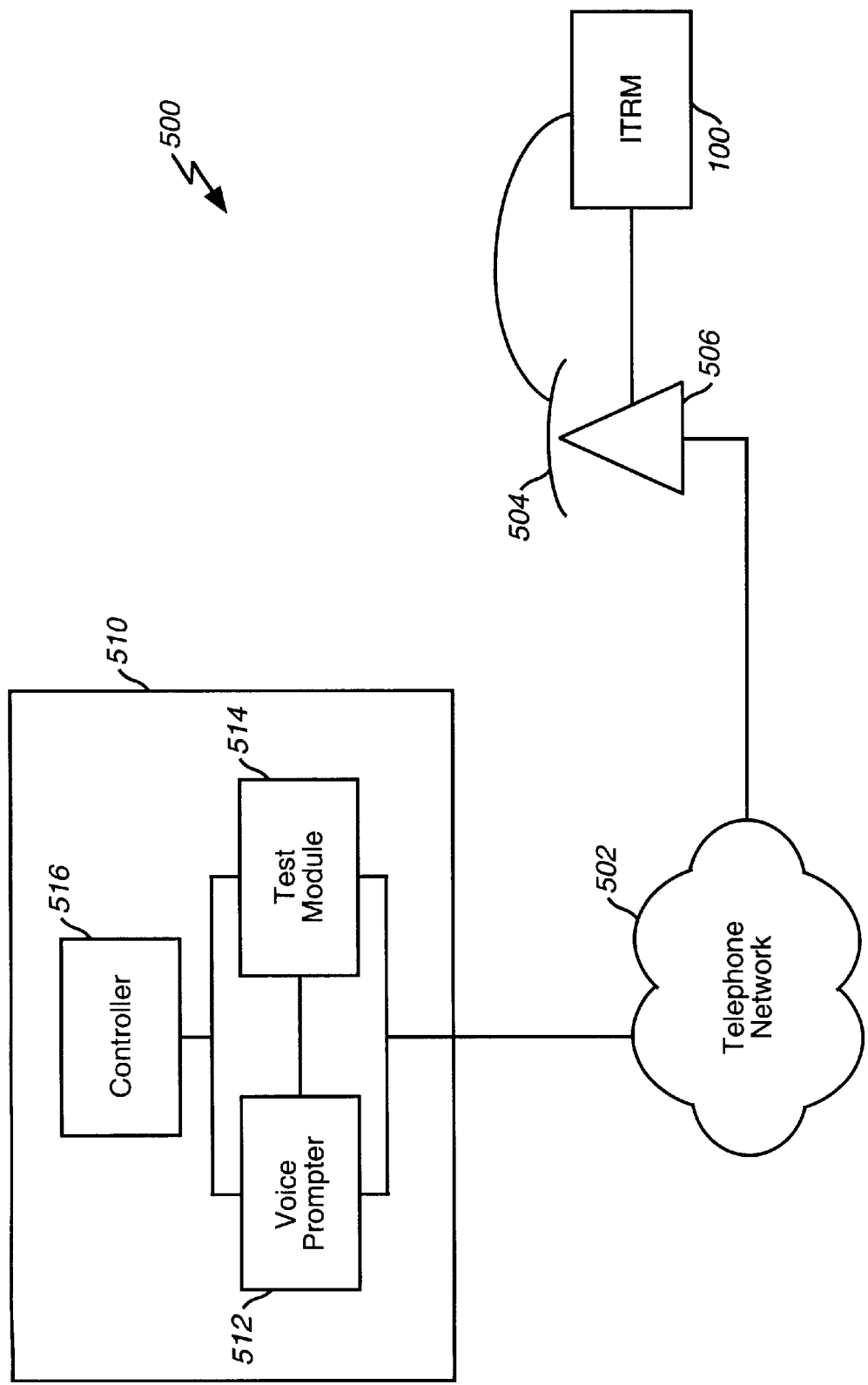
FIGS. 5 and 7 are block diagrams depicting an interactive telephone test system in its operating environment according to two embodiments of the present invention.

FIG. 1 is a circuit block diagram depicting one implementation 100 of the ITRM according to a preferred embodiment of the present invention. In this embodiment, ITRM 100 is connected between the station set and handset of a telephone set, as shown in FIG. 5.

ITRM 100 includes a jack J1 for connection to a telephone station set and a jack J2 for connection to a telephone handset. Jack J1 receives station set microphone leads SMIC1 and SMIC2 and station set receiver leads SREC1 and SREC2. Jack J2 receives handset microphone leads HMIC1 and HMIC2 and handset receiver leads HREC1 and HREC2. ITRM 100 also includes three switches S1, S2, and S3 for imposing three different functions upon the telephone connection.

Switch S1, also referred to as a "silence" switch, disconnects the telephone handset from the connection and terminates the connection to a "silence circuit." Referring to FIG. 1, the silence circuit includes resistors R5 and R6. In a preferred embodiment, each of resistors R5 and R6 has a resistance of 620 ohms. When switch S1 is operated, resistor R6 is coupled between station set microphone leads SMIC1 and SMIC2 and resistor R5 is coupled between station set receiver leads SREC1 and SREC2. In addition, station set microphone leads SMIC1 and SMIC2 and station set receiver leads SREC1 and SREC2 are decoupled from handset microphone leads HMIC1 and HMIC2 and handset receiver leads HREC1 and HREC2. This operation eliminates ambient noise produced by the telephone handset. The condition imposed upon the connection by this operation can be used to facilitate measurement of line noise, also known as "quiet channel noise," and measurement of echo path loss and delay, without interference from the handset, as would be apparent to one skilled in the relevant art.

Switch S2, also referred to as a "loopback" switch, is used to echo signals received over the connection being tested. When operated, switch S2 disconnects the handset leads from the station set leads, and instead connects the station set leads to "echo circuit" 104. Echo circuit 104 transmits over station set microphone lead SMIC1 the signals received over station set receiver lead SREC1, and transmits over station set microphone lead SMIC2 the signals received over station set receiver lead SREC2. Echo circuit 104 is described in greater detail below. The condition imposed upon the connection by this operation is necessary for the measurement of the round-trip delay of a signal transmitted by the test coordinator when there is otherwise no echo on the connection, as would be apparent to one skilled in the relevant art.

Switch S3, also referred to as a "tone" switch, is used to transmit a signal with known characteristics over the connection. In a preferred embodiment the known signal is a sinusoidal signal of predetermined amplitude and frequency. When operated, switch S3 disconnects the handset leads from the station set lead and couples the station set leads to a "tone circuit" that includes a resistor R4 and an "oscillator circuit" 106. In a preferred embodiment, switch S3 couples the station set receiver leads to resistor R4, and connects the station set microphone leads to oscillator circuit 106. In a preferred embodiment, resistor R4 has a resistance of 620 ohms. Oscillator circuit 106 produces the known signal, and is described in detail below. The condition imposed upon the connection by this operation can be used to facilitate the measurement of line loss, as would be apparent to one skilled in the relevant art.

Figure 2:
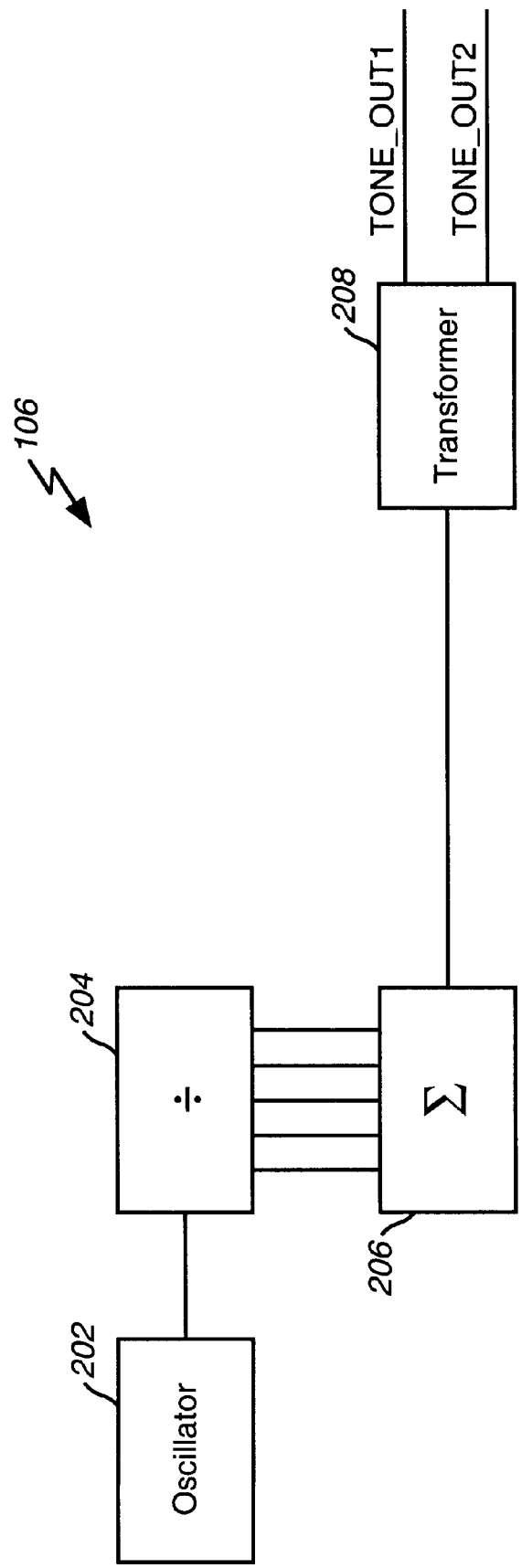
FIG. 2 is a circuit diagram that depicts one implementation of an oscillator circuit according to a preferred embodiment of the present invention.

FIG. 2 is a circuit diagram that depicts one implementation of oscillator circuit 106 according to a preferred embodiment of the present invention. Referring to FIG. 2, oscillator circuit 106 includes an oscillator 202, a divider 204, a summer 206, and a transformer 208. Oscillator 202 produces a square wave of a known frequency, which is used to clock divider 204. Divider 204 produces a number of square waves at particular frequencies and amplitudes based on the clock signal. Summer 206 combines these square waves to produce a sinusoid of a particular frequency and amplitude. In another embodiment, the amplitude and frequency of sinusoid can be adjusted by the user. Finally, the sinusoid is coupled to switch S2 using transformer 208.

Figure 3:
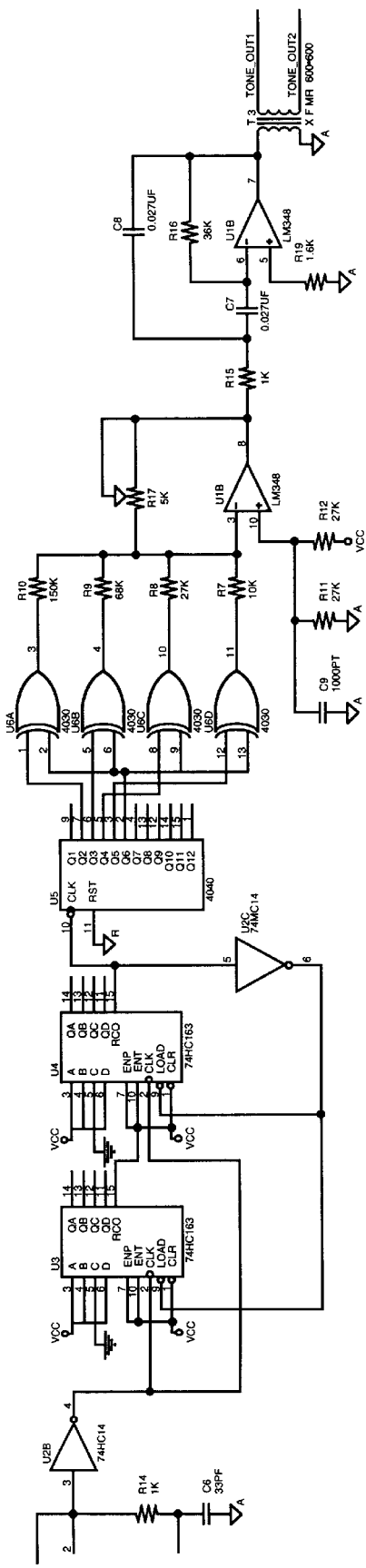
FIG. 3 is a circuit diagram depicting a particular implementation of an oscillator circuit according to a preferred embodiment of the present invention.

FIG. 3 is a circuit diagram depicting a particular implementation of oscillator circuit 106 according to a preferred embodiment of the present invention. Referring to FIG. 3, oscillator circuit 106 includes an oscillator Y1; inverters U2A, U2B, and U2C; counters U3 and U4; shift register U5; EXCLUSIVE-OR gates U6A, U6B, U6C, and U6D; and operational amplifiers U1B and U1C. Oscillator Y1 is a crystal oscillator operating at a frequency of 4.4 MHZ. Inverters U2A and U2B are used to convert the oscillator signal to a square wave.

This square wave is used to clock counters U3 and U4, which together with inverter U2C form a divide-by-69 circuit that produces a square wave with a frequency of approximately 64 kHz. The 64 kHz square wave is used to clock shift register U5. Shift register U5 produces five square waves of different frequencies. These square waves are summed by a "Welsh transform" circuit to produce a sinusoid having a frequency of approximately 1004 Hz.

The Welsh transform circuit includes EXCLUSIVE-OR gates U6A, U6B, U6C, and U6D, operational amplifier U1C, resistors R7, R8, R9, R10, R11, R12, and R17, as shown in FIG. 3. The EXCLUSIVE-OR gates combine the square waves produced by shift register U5 in different combinations, which are weighted by resistors R7–10 and summed by operational amplifier U1C to produce the sinusoid. The sinusoid is filtered at operational amplifier U1B, and is coupled to switch S3 by transformer T3. The Welsh transform circuit is well-known in the relevant art.

Figure 4:
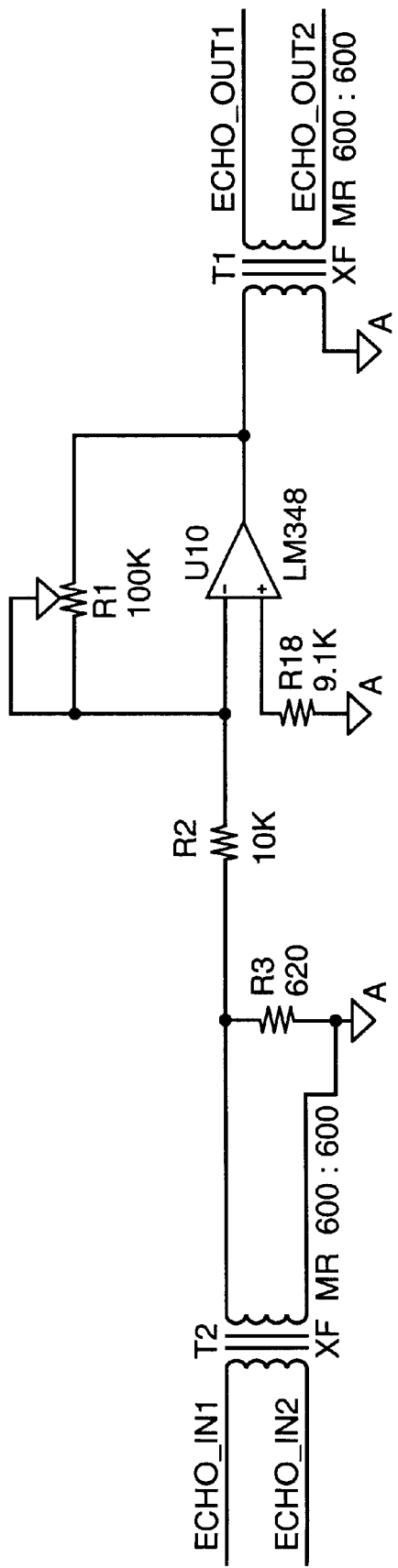
FIG. 4 is a circuit diagram depicting a particular implementation of an echo circuit according to a preferred embodiment of the present invention.

FIG. 4 is a circuit diagram depicting a particular implementation of echo circuit 104 according to a preferred embodiment of the present invention. Echo circuit 104 includes two transformers T1 and T2 and an amplifier circuit. When switch S2 is operated, transformer T2 couples the input of the amplifier circuit to the station set receiver leads and transformer T1 couples the output of the amplifier circuit to the station set microphone leads. Referring to FIG. 4, amplifier circuit includes an operational amplifier U1A and resistors R1, R2, R3, and R18. In a preferred embodiment, the amplifier circuit has a gain of 10.

Figure 6:
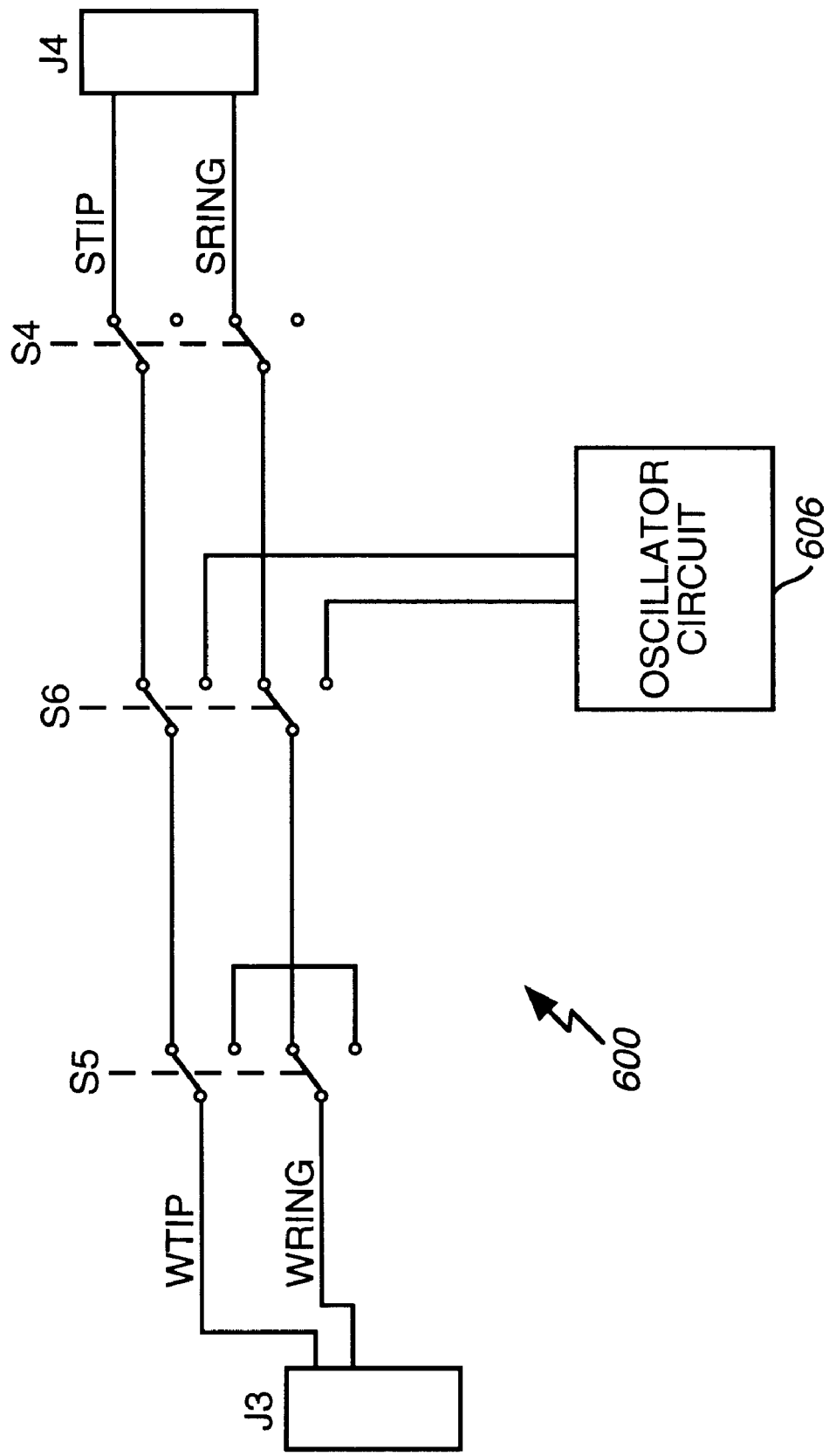
Figure 7:
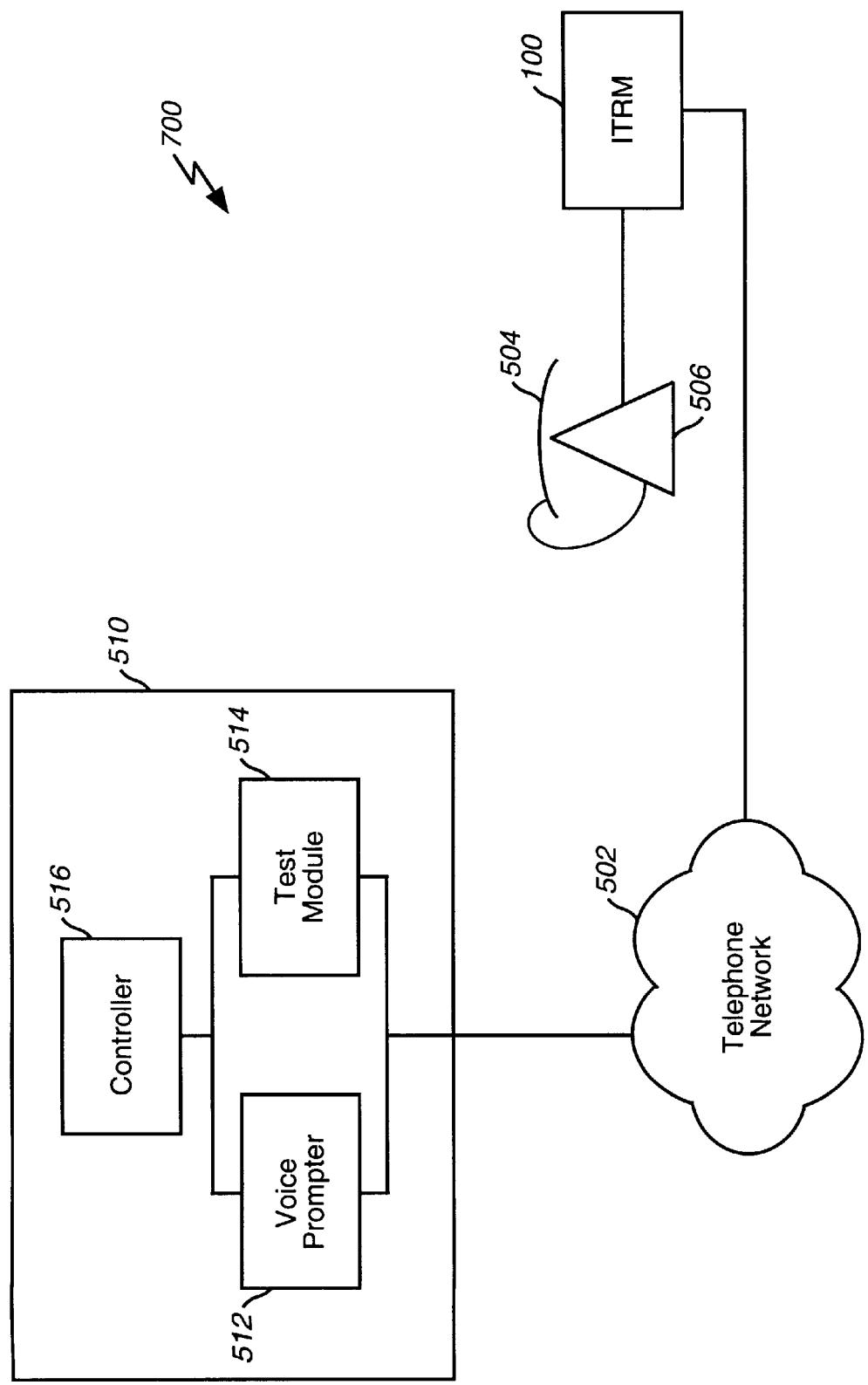

FIG. 6 is a circuit block diagram depicting an alternative implementation 600 of the ITRM according to a preferred embodiment of the present invention. In this embodiment, ITRM 600 is connected between the station set 506 of a telephone set and a telephone network 502, as shown in FIG. 7.

ITRM 600 includes a jack J3 for connection to a telephone network 502 (for example, via a standard telephone wall jack in a residential setting) and a jack J4 for connection to a telephone station set 506. Jack J3 receives network "tip" lead WTIP and network "ring" lead WRING. Jack J4 receives station set tip lead STIP and station set ring lead SRING. ITRM 600 also includes three switches S4, S5, and S6 for imposing three different functions upon the telephone connection.

Switch S4, also referred to as a "silence" switch, disconnects the telephone station set from the network connection. In one embodiment, this is accomplished by merely imposing an open circuit upon the network leads (the WTIP and WRING leads), as shown in FIG. 6. Switch S5, also referred to as a "loopback" switch, is used to echo signals received over the connection being tested. When operated, switch S5 disconnects the network leads from the STIP and SRING leads, and instead connects the network leads together.

Switch S6, also referred to as a "tone" switch, is used to transmit a signal with known characteristics over the connection being tested. In a preferred embodiment the known signal is a sinusoidal signal of predetermined amplitude and frequency. When operated, switch S6 disconnects the network leads from the station set leads, and instead couples the network leads to an "oscillator circuit" 606. Oscillator circuit 606 produces the known signal, as described above for oscillator circuit 106.

Interactive Telephone Test System

FIGS. 5 and 7 are block diagrams depicting an interactive telephone test system in its operating environment according to two embodiments of the present invention. The interactive telephone test system also includes a test coordinator 510. In FIG. 5, ITRM 100 is connected between a telephone station set 506 and a telephone handset 504, as described above with respect to FIG. 1. In FIG. 5, test coordinator 510 and telephone station set 506 are shown connected by a telephone network 502. In FIG. 7, ITRM 600 is connected between a telephone station set 506 and a telephone network 502, as described above with respect to FIG. 6. In FIG. 7, test coordinator 510 and ITRM 600 are shown connected by a telephone network 502.

Test coordinator 510 includes a voice prompter 512, a test module 514, and a controller 516. Voice prompter 512 can be a computer-controlled voice synthesizer or the like, as is well-known in the relevant art. Test module 514 includes a suite of test equipment for testing connections established by test coordinator 510. Test module 514 and voice prompter 512 operate under the control of controller 516. Controller 516 can be a computer-based control unit, as described below. Of course, other configurations for test coordinator 510 are possible within the spirit and scope of the present invention. Example configurations are disclosed in commonly-owned U.S. Pat. No. 5,448,624, issued Sep. 5, 1995 entitled "Telephone Network Monitoring Method and System" and U.S. Pat. No. 5,241,584, issued Aug. 31, 1993 entitled "Response Time Evaluation Unit," the disclosures of which are incorporated by reference herein in their entirety.

Figure 8:
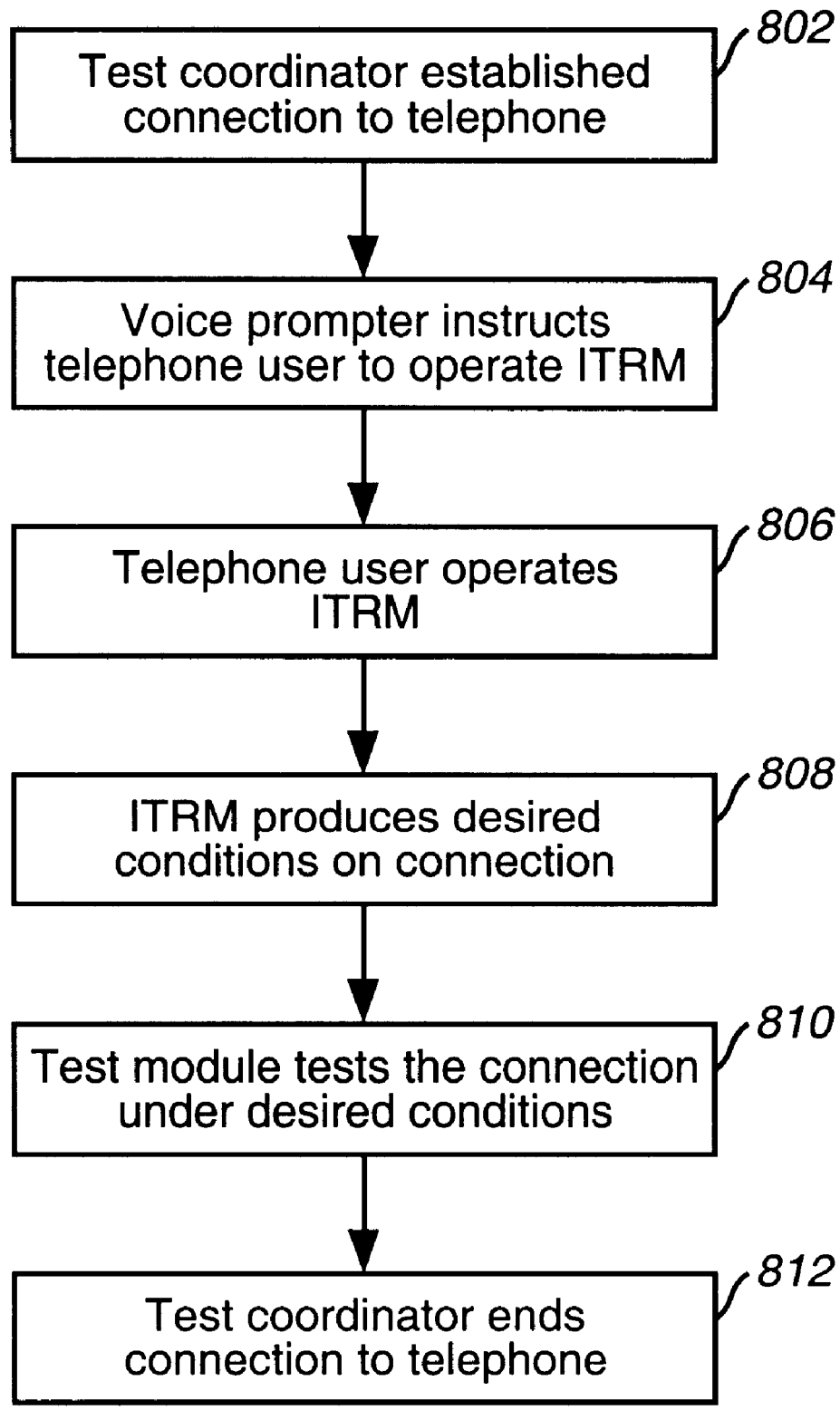
FIG. 8 is a flowchart depicting the operation of the interactive telephone test system according to a preferred embodiment of the present invention.

FIG. 8 is a flowchart depicting the operation of the interactive telephone test system according to a preferred embodiment of the present invention. The process begins when test coordinator 510 establishes a connection to telephone station set 506, as shown in step 802. When the telephone user answers, voice prompter 512 instructs the user to operate the ITRM to produce a desired condition on the connection, as shown in step 804. For example, assume voice prompter 512 instructs the user to operate the "tone" switch on the ITRM for 10 seconds.

In accordance with the instructions provided, the telephone user operates the ITRM as instructed, as shown in a step 806. In this example, the telephone user operates the "tone" switch on the ITRM. In response, the ITRM produces the desired condition on the connection, as shown in step 808. In this example, the ITRM transmits a signal with known characteristics over the connection.

The test module then tests the connection under the desired conditions, as shown in step 810. For example, the test module measures the amplitude of the signal received from the ITRM and compares the received amplitude to the known amplitude of the signal transmitted by the ITRM to determine the line loss of the connection.

Steps 808 and 810 can be repeated for other conditions and tests. For example, the telephone user can be instructed to operate the silence switch in step 808. Test module 514 can then perform a measurement of the line noise on the connection, and transmit a test signal to test for and measure the echo characteristics of the connection, in step 810.

As another example, the telephone user can be instructed to operate the loopback switch in step 808. Test module 514 can then transmit a signal to ITRM 100, which echoes the signal back to test module 514. The times of transmission and reception of the signal can be compared to determine the roundtrip delay of the connection.

As would be apparent to one skilled in the relevant arts, the ITRM can include other circuits to impose other conditions upon the connection without departing from the spirit and scope of the present invention. In addition, test module 514 can perform other measurements within the scope of the present invention. When the tests are complete, the test coordinator ends the connection to the telephone, as shown in step 812.

Example Environment

Figure 9:
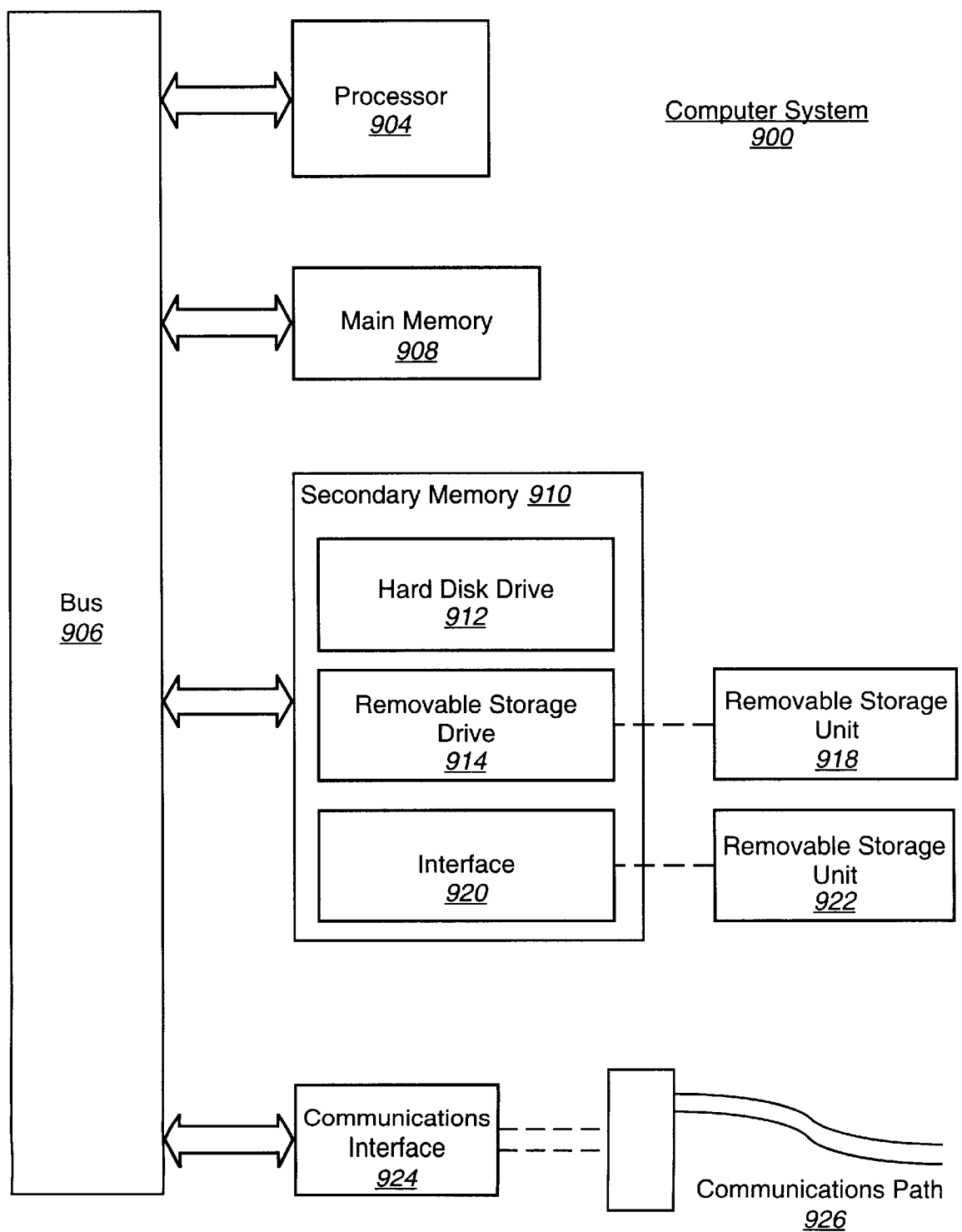
FIG. 9 depicts an example computer system according to a preferred embodiment of the present invention.

Portions of the present invention may be implemented using hardware, software or a combination thereof and may be implemented in a computer system or other processing system. In fact, in one embodiment, the invention is directed toward a computer system capable of carrying out the functionality described herein. An example computer system 902 is shown in FIG. 9. The computer system 902 includes one or more processors, such as processor 904. The processor 904 is connected to a communication bus 906. Various software embodiments are described in terms of this example computer system. After reading this description, it will become apparent to a person skilled in the relevant art how to implement the invention using other computer systems and/or computer architectures.

Computer system 902 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 902. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 902.

Computer system 902 can also include a communications interface 924. Communications interface 924 allows software and data to be transferred between computer system 902 and external devices. Examples of communications interface 924 can include a modem, a network interface (such as an Ethernet card), a communications port, a PCM-CIA slot and card, etc. Software and data transferred via communications interface 924 are in the form of signals which can be electronic, electromagnetic, optical or other signals capable of being received by communications interface 924. These signals are provided to communications interface 924 via a communications path 926, which can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912, and the signals on communications path 926. These computer program products are means for providing software to computer system 902.

Computer programs (also called computer control logic) are stored in main memory and/or secondary memory 910. Computer programs can also be received via communications interface 924. Such computer programs, when executed, enable the computer system 902 to perform the features of the present invention as discussed herein. In particular, the computer programs, when executed, enable the processor 904 to perform the features of the present invention. Accordingly, such computer programs represent controllers of the computer system 902.

In an embodiment where the invention is implement using software, the software may be stored in a computer program product and loaded into computer system 902 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Conclusion

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An interactive telephone response module coupled between the handset and station set of a telephone set comprising:

a station set jack for receiving microphone leads and receiver lead from the station set;

a handset jack for receiving microphone leads and receiver leads from the handset; and at least one circuit coupled between said handset jack and said station set jack for imposing a selected condition upon a telephone line connected to the station set of the telephone, wherein said at least one circuit comprises:
   a silence circuit that disconnects the handset from the station set;
   a loopback circuit that transmits over said station set microphone leads signals received over said station set receiver leads; and
   a tone circuit that transmits over said station set microphone leads at least one sinusoidal signal of predetermined amplitude and frequency.

2. The interactive telephone response module of claim 1, further comprising:

a silence switch for engaging said silence circuit when operated by a user;

a loopback switch for engaging said loopback circuit when operated by a user; and a tone switch for engaging said tone circuit when operated by a user.

3. The interactive telephone response module of claim 2, wherein said silence circuit comprises:

a first resistor; and a second resistor;

wherein said first resistor is coupled between said station set microphone leads and said second resistor is coupled between said station set receiver leads when said silence switch is operated.

4. The interactive telephone response module of claim 2, wherein said loopback circuit comprises:

an echo circuit;

wherein said echo circuit is coupled between said station set microphone leads and said station set receiver leads when said loopback switch is operated.

5. The interactive telephone response module of claim 4, wherein said echo circuit comprises:
    an amplifier;
    a first transformer that couples said station set microphone leads to said amplifier; and
    a second transformer that couples said station set receiver leads to said amplifier.

6. The interactive telephone response module of claim 2, wherein said tone circuit comprises:
    a resistor; and
    an oscillator circuit;
    wherein said resistor is coupled between said station set receiver leads and said oscillator circuit is coupled between said station set microphone leads when said tone switch is operated.

7. The interactive telephone response module of claim 6, wherein said oscillator circuit comprises:
    an oscillator that produces an oscillator signal;
    a divider, responsive to said oscillator, that produces multiple square waves based on said oscillator signal;
    a summer that weights and sums said square waves to produce a sinusoid; and
    a transformer that produces said at least one sinusoidal signal based on said sinusoid.

8. A telephone comprising:
    a station set;
    a handset; and
    an interactive telephone response module comprising at least one circuit coupled between said handset and said station set for imposing a selected condition upon a telephone line connected to the station set of the telephone, wherein said at least one circuit comprises:
    a silence circuit that disconnects the handset from the station set;
    a loopback circuit that transmits to said station set signals received from said station set; and
    a tone circuit that transmits to said station set at least one sinusoidal signal of predetermined amplitude and frequency.

9. The telephone of claim 8, wherein said interactive telephone response module further comprises:
    a silence switch for engaging said silence circuit when operated by a user;
    a loopback switch for engaging said loopback circuit when operated by a user; and
    a tone switch for engaging said tone circuit when operated by a user.

10. The telephone of claim 9, wherein said silence circuit comprises:
    a first resistor; and
    a second resistor;
    wherein said first resistor is coupled between the station set microphone leads and said second resistor is coupled between the station set receiver leads when said silence switch is operated.

11. The telephone of claim 9, wherein said loopback circuit comprises:
    an echo circuit;
    wherein said echo circuit is coupled between the station set microphone leads and the station set receiver leads when said loopback switch is operated.

12. The telephone of claim 11, wherein said echo circuit comprises:
    an amplifier; and
    a first transformer that couples the station set microphone leads to said amplifier;
    a second transformer that couples the station set receiver leads to said amplifier.

13. The telephone of claim 9, wherein said tone circuit comprises:
    a resistor; and
    an oscillator;
    wherein said resistor is coupled between the station set receiver leads and said oscillator is coupled between the station set microphone leads when said tone switch is operated.

14. The telephone of claim 13, wherein said oscillator circuit comprises:
    an oscillator that produces an oscillator signal;
    a divider, responsive to said oscillator, that produces multiple square waves based on said oscillator signal;
    a summer that weights and sums said square waves to produce a sinusoid; and
    a transformer that produces said at least one sinusoidal signal based on said sinusoid.

* * * * *